(12) United States Patent
Siegel et al.

(10) Patent No.: US 11,092,200 B2
(45) Date of Patent: Aug. 17, 2021

(54) FRICTION PLATE AND CLUTCH ASSEMBLY INCLUDING THE SAME

(71) Applicant: BorgWarner Inc., Auburn Hills, MI (US)

(72) Inventors: Benjamin A. Siegel, Chicago, IL (US); Paul H. Elsesser, Glen Ellyn, IL (US); Richard W. Pridgen, Jr., Arlington Heights, IL (US); David T. Vierk, Mokena, IL (US)

(73) Assignee: BorgWarner Inc., Auburn Hills, MI (US)

( * ) Notice: Subject to any disclaimer, the term of this patent is extended or adjusted under 35 U.S.C. 154(b) by 19 days.

(21) Appl. No.: 16/159,103

(22) Filed: Oct. 12, 2018

(65) Prior Publication Data

US 2020/0116207 A1    Apr. 16, 2020

(51) Int. Cl.
*F16D 13/64* (2006.01)
*F16D 13/74* (2006.01)
(Continued)

(52) U.S. Cl.
CPC .......... *F16D 13/648* (2013.01); *F16D 13/52* (2013.01); *F16D 13/70* (2013.01); *F16D 13/74* (2013.01);
(Continued)

(58) Field of Classification Search
CPC .......... F16D 13/70–13/74; F16D 13/64; F16D 13/648
See application file for complete search history.

(56) References Cited

U.S. PATENT DOCUMENTS 3,494,452 A * 2/1970 Finkin .................... F16D 13/52
                                                             192/70.14
3,603,438 A    9/1971 Hashizume et al.
(Continued)

FOREIGN PATENT DOCUMENTS

DE    10 2010 006 015        8/2011
DE    102010006015 A1       8/2011
(Continued)

OTHER PUBLICATIONS

U.S. Appl. No. 16/434,294, filed Jun. 7, 2019, 34 pages.
(Continued)

*Primary Examiner* — Ernesto A Suarez
*Assistant Examiner* — Lillian T Nguyen
(74) *Attorney, Agent, or Firm* — Howard & Howard Attorneys PLLC

(57) ABSTRACT

A friction plate includes a core plate defining a bore. The core plate includes an interior core surface defining the bore, an exterior core surface radially spaced from the interior core surface, a first clutch face extending between the interior core surface and the exterior core surface and facing a first direction, and a second clutch face extending between the interior core surface and the exterior core surface and facing a second direction opposite the first direction. The friction plate also includes a friction material disposed on at least one of the first and second clutch faces. The core plate also includes a fluid directing portion. A first plate thickness is defined between the first and second clutch faces. A second plate thickness is defined at the fluid directing portion. The second thickness is greater than the first thickness.

23 Claims, 5 Drawing Sheets

(51) Int. Cl.
*F16D 13/70* (2006.01)
*F16D 13/52* (2006.01)

(52) U.S. Cl.
CPC ...... *F16D 2300/10* (2013.01); *F16D 2300/14* (2013.01)

(56) References Cited

U.S. PATENT DOCUMENTS

| | | | | |
|---|---|---|---|---|
| 3,695,406 | A | * | 10/1972 | Graham ................ F16D 66/02 192/107 M |
| 4,068,747 | A | | 1/1978 | Snoy |
| 5,454,454 | A | | 10/1995 | Easton et al. |
| 5,730,259 | A | * | 3/1998 | Umezawa ............. F16D 13/648 188/250 B |
| 5,975,267 | A | | 11/1999 | Takakura et al. |
| 6,006,885 | A | * | 12/1999 | Borgeaud ............... F16D 13/52 192/107 R |
| 6,035,991 | A | | 3/2000 | Willwerth et al. |
| 6,062,367 | A | * | 5/2000 | Hirayanagi ........... F16D 13/648 192/107 R |
| 6,419,065 | B1 | | 7/2002 | Mieda |
| 9,199,304 | B2 | | 12/2015 | Keating et al. |
| 9,587,691 | B2 | * | 3/2017 | Kirkpatrick ............ F16D 55/40 |
| 10,487,885 | B2 | | 11/2019 | Lindemann et al. |
| 2006/0144668 | A1 | * | 7/2006 | Voegele ................ F16D 13/648 192/107 R |
| 2007/0029157 | A1 | | 2/2007 | Roche |
| 2007/0246321 | A1 | * | 10/2007 | Toya ....................... F16D 13/62 192/70.14 |
| 2007/0251795 | A1 | | 11/2007 | Toya |
| 2008/0073171 | A1 | | 3/2008 | Mordukhovich et al. |
| 2011/0048889 | A1 | | 3/2011 | Vierk et al. |
| 2013/0192950 | A1 | | 8/2013 | Warren et al. |
| 2013/0270054 | A1 | | 10/2013 | Dziurda |
| 2014/0291107 | A1 | | 10/2014 | Lister et al. |
| 2016/0265597 | A1 | | 9/2016 | Smith et al. |
| 2017/0234370 | A1 | | 8/2017 | Eindhoven |
| 2018/0259005 | A1 | | 9/2018 | Nikola et al. |

FOREIGN PATENT DOCUMENTS

| | | |
|---|---|---|
| GB | 141910 A | 4/1920 |
| WO | 2016206683 A1 | 12/2016 |

OTHER PUBLICATIONS

English language abstract and machine-assisted English translation for WO 2016/206683 extracted from espacenet.com database on Oct. 31, 2018, 9 pages.

U.S. Appl. No. 16/444,333, filed Jun. 18, 2019, 20 pages.

DE 10 2010 006 015, Aug. 18, 2011, Machine-Assisted English Translation.

English language abstract and machine-assisted English translation for DE 10 2010 006 015 extracted from espacenet.com database on Nov. 2, 2020, 7 pages.

* cited by examiner

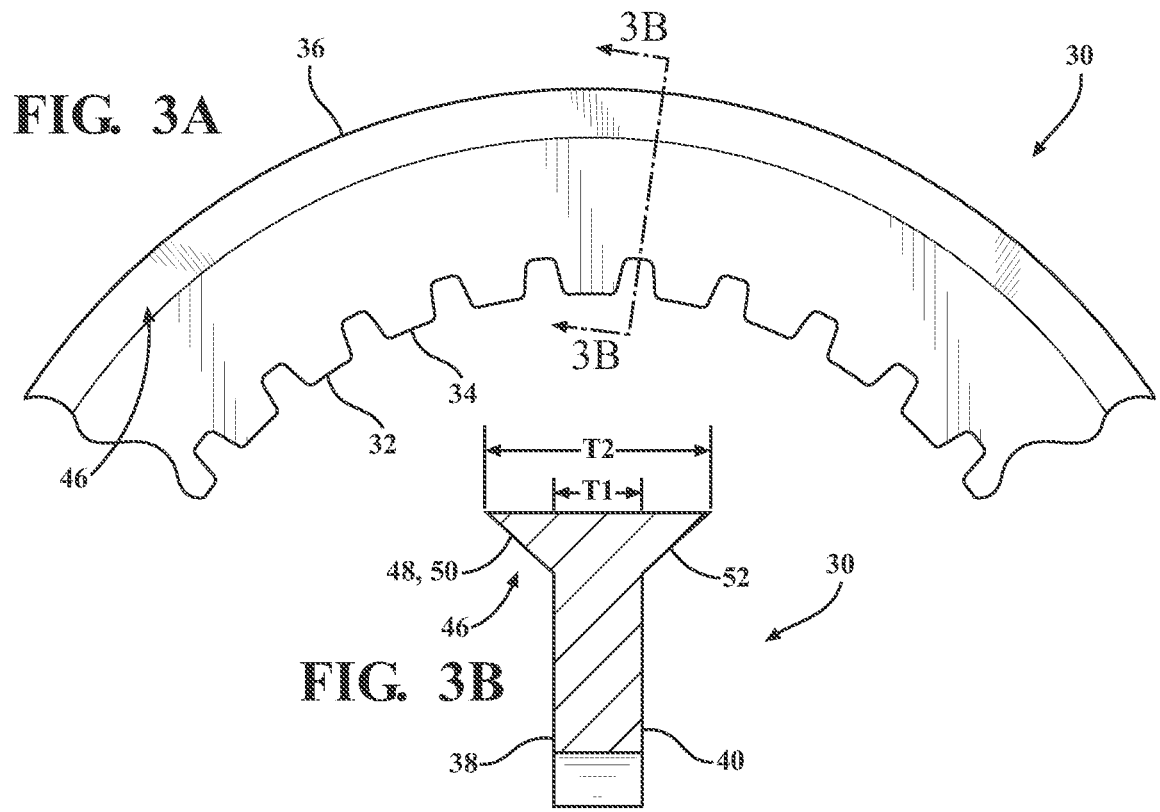
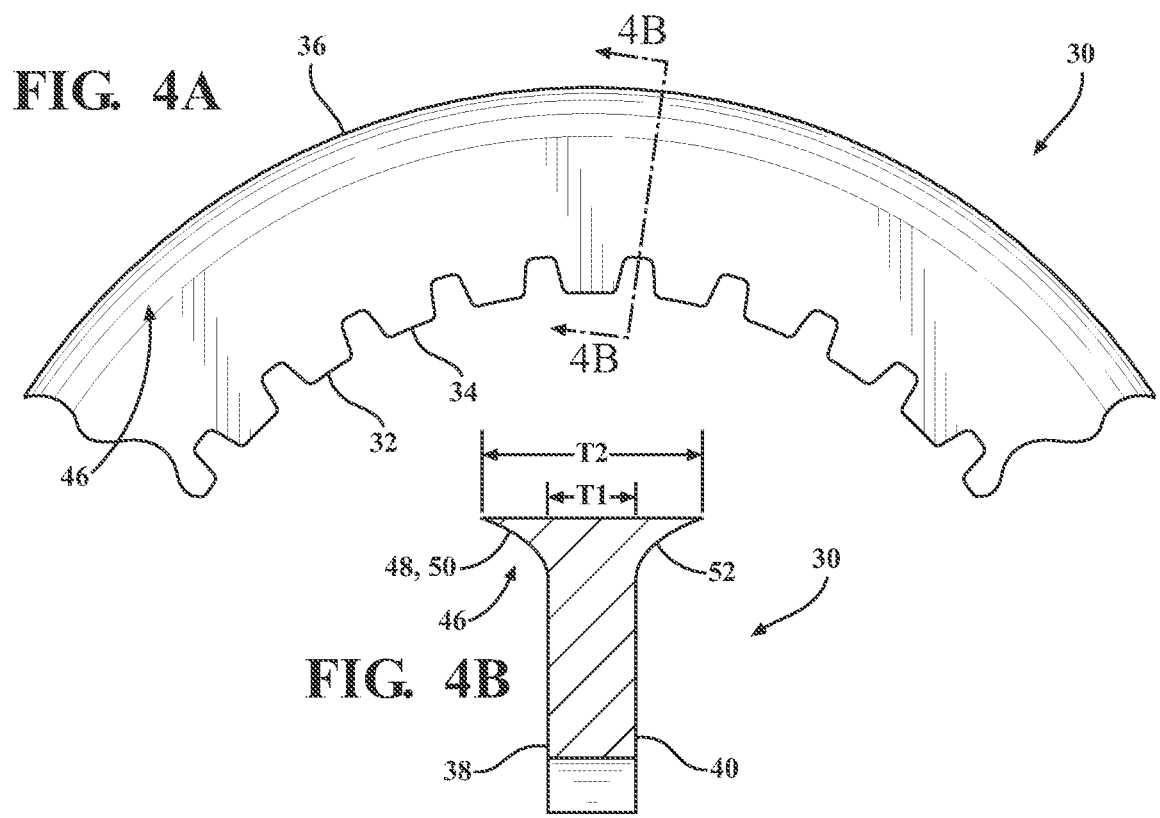

FRICTION PLATE AND CLUTCH ASSEMBLY INCLUDING THE SAME

BACKGROUND OF THE INVENTION

1. Field of the Invention

The present invention generally relates to a friction plate and, more specifically, to a friction plate for use in a clutch assembly of a wet friction system.

2. Description of the Related Art

Several components of a motor vehicle powertrain may employ a wet friction system to facilitate the transfer of power from the motor vehicle's power generator (e.g., an internal combustion engine, electric motor, fuel cell, etc.) to drive wheels of the motor vehicle. A transmission, located downstream from the power generator that enables vehicle launch, gear shifting, and other torque transfer events, is one such component that may employ a wet friction system. Some form of a clutch assembly may be found throughout many different types of transmissions currently available for motor vehicle operation. A wet clutch may be utilized in a torque converter for an automatic transmission, in a multi-plate wet clutch pack for an automatic transmission or a semi-automatic dual-clutch transmission (DCT), and in a wet start clutch that may be incorporated into an automatic transmission equipped with as many as seven to ten gears as a substitute for the torque converter, to name but a few examples. Similar wet clutches may be found elsewhere in the vehicle powertrain besides the transmission.

The clutch assembly typically includes a plurality of friction plates rotatably coupled to a shaft, with the plurality friction plates being used to interlock two or more opposed, rotating surfaces in the presence of a lubricant by imposing selective interfacial frictional engagement between those surfaces. Each friction plate includes a core plate defining a bore for receiving the shaft such that each friction plate is rotatably coupled to the shaft. Each friction plate additionally includes a friction material disposed on the core plate, which effectuates the intended interlocking of frictional engagement between the plurality of friction plates. The presence of the lubricant cools and reduces wear of the friction material and permits some initial slip to occur so that torque transfer proceeds gradually, although very quickly, in an effort to avoid the discomfort that may accompany an abrupt torque transfer event (i.e., shift shock).

During operation, conventional friction plates move between an engaged position where the plurality friction plates are engaged with one another, and a disengaged position where the plurality friction plates are disengaged from one another. However, clutch assemblies including conventional friction plates often experience drag torque when the plurality of friction plates are rotating in the disengaged position, which is caused by the friction plates rotating through the lubricant. Increased drag torque reduces performance of the clutch assembly and, in turn, the wet friction system, and reduces fuel economy of the motor vehicle's power generator.

As such, there remains a need to provide an improved friction plate for a clutch assembly.

SUMMARY OF THE INVENTION AND ADVANTAGES

A friction plate for use in a clutch assembly of a wet friction system including a lubricant, with the clutch assembly including a shaft, and with the friction plate including a core plate defining a bore extending along an axis and adapted to receive and be rotatably coupled to the shaft. The core plate includes an interior core surface defining the bore, an exterior core surface radially spaced from the interior core surface with respect to the axis such that the exterior core surface surrounds the interior core surface about the axis, a first clutch face extending between the interior core surface and the exterior core surface and facing a first direction along the axis, and a second clutch face extending between the interior core surface and the exterior core surface and facing a second direction opposite the first direction along the axis. The friction plate also includes a friction material disposed on at least one of the first and second clutch faces. The core plate also includes a fluid directing portion. A first plate thickness is defined between the first and second clutch faces with respect to the axis. A second plate thickness is defined at the fluid directing portion with respect to the axis. The second thickness is greater than the first thickness such that the fluid directing portion is configured to direct the lubricant axially away from at least one of the first and second clutch faces along the axis during rotation of the core plate for limiting drag torque in the clutch assembly. A method of producing the core plate is also disclosed herein.

Accordingly, the core plate including the fluid directing portion having the second thickness greater than the first thickness limits drag torque in the clutch assembly, which ultimately increases performance of the clutch assembly, and increases fuel economy.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3A is a side view of one embodiment of the core plate, with the core plate having a fluid directing portion, and with the fluid directing portion including a ramped surface having a linear configuration;

FIG. 3B is a side cross-sectional view of the core plate of FIG. 3A taken along line 3-3;

FIG. 4A is a side view of another embodiment of the core plate, with the ramped surface of the fluid directing portion having a curved configuration;

FIG. 4B is a side cross-sectional view of the core plate of FIG. 4A taken along line 4-4;

DETAILED DESCRIPTION OF THE INVENTION

Figure 1:
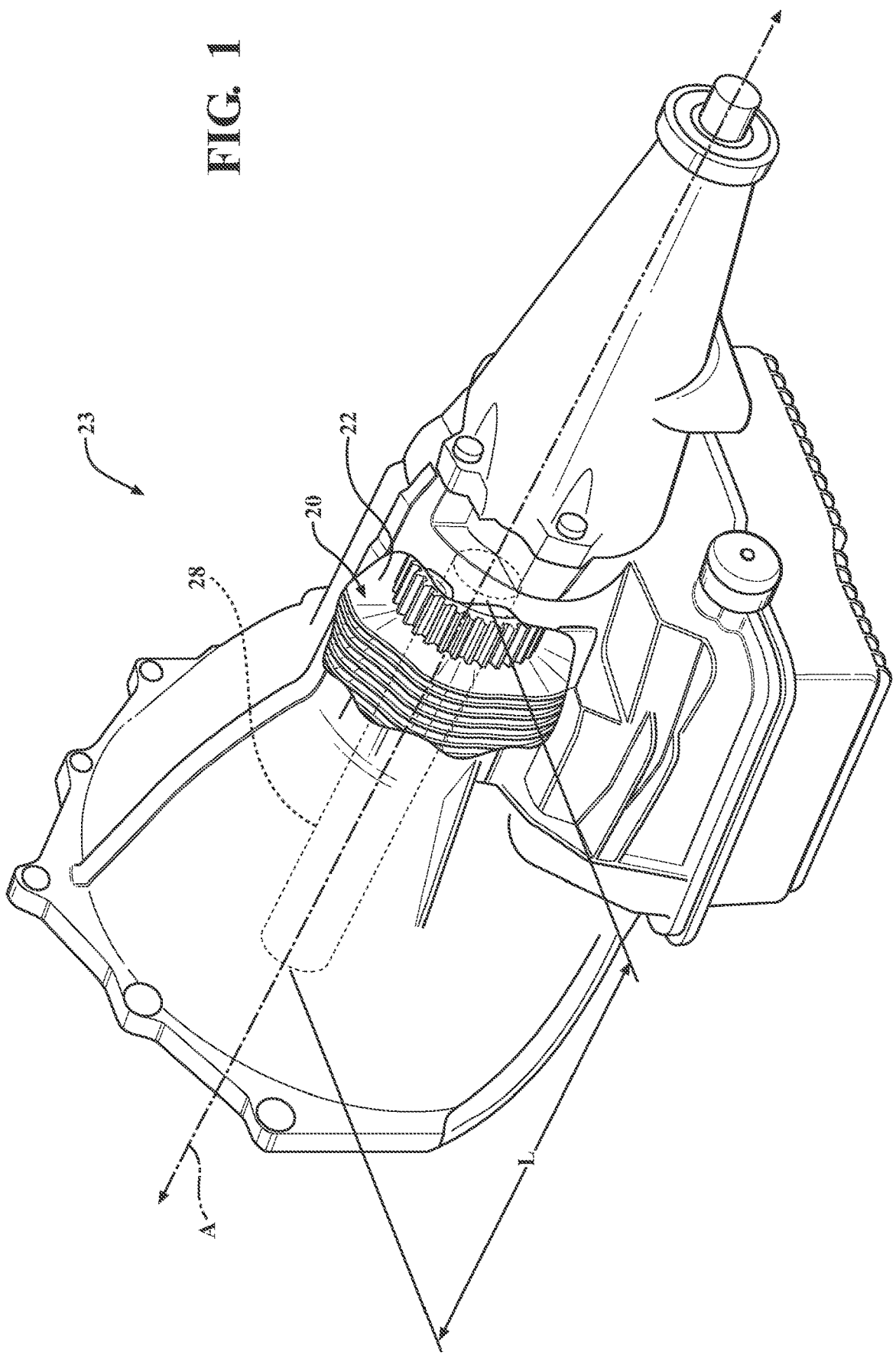
FIG. 1 is a perspective view of a clutch assembly including a plurality of friction plates in a transmission.
Figure 2A:
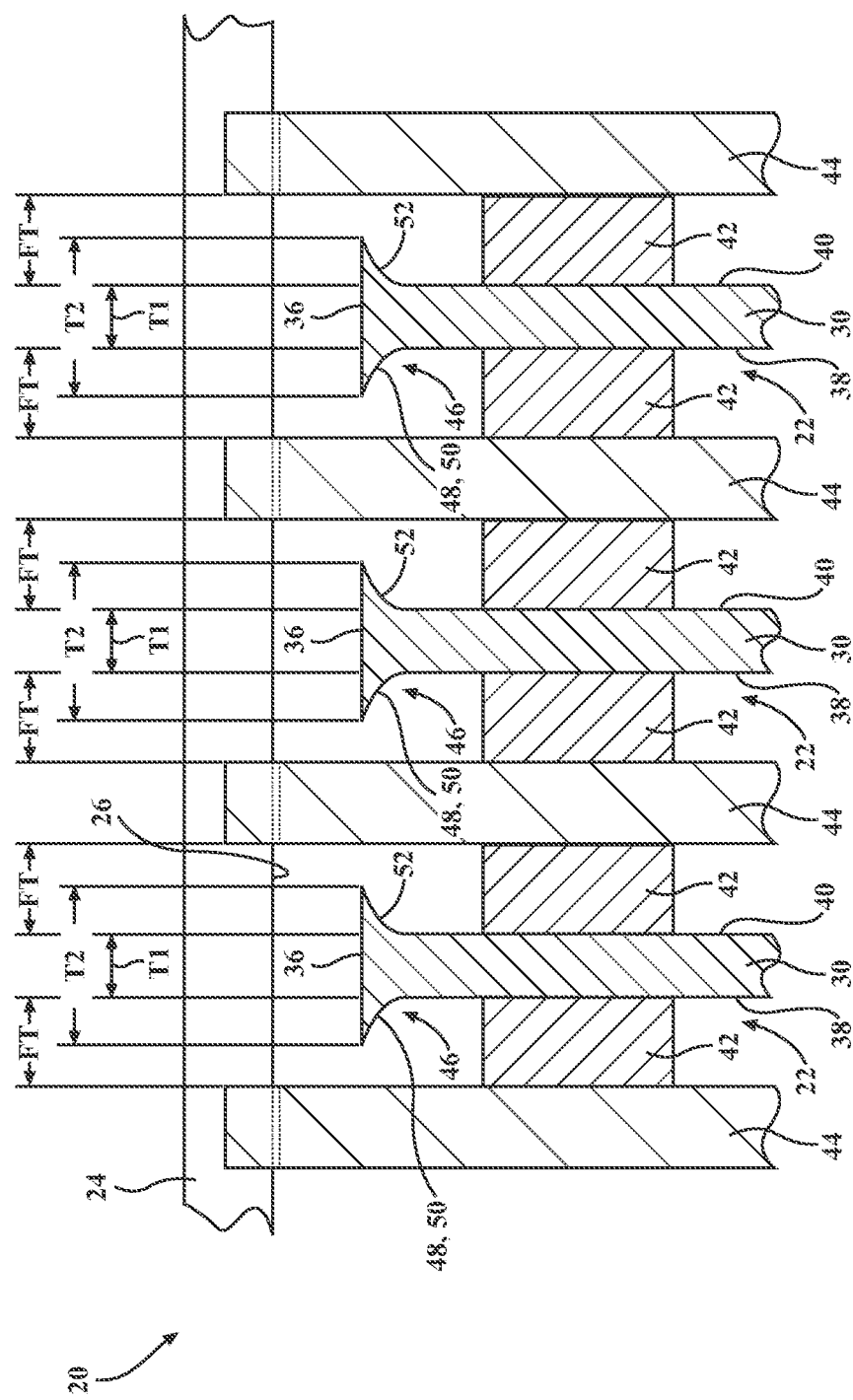
FIG. 2A is a cross-sectional view of the plurality of friction plates, with the plurality of friction plates being in an engaged state.
Figure 2B:
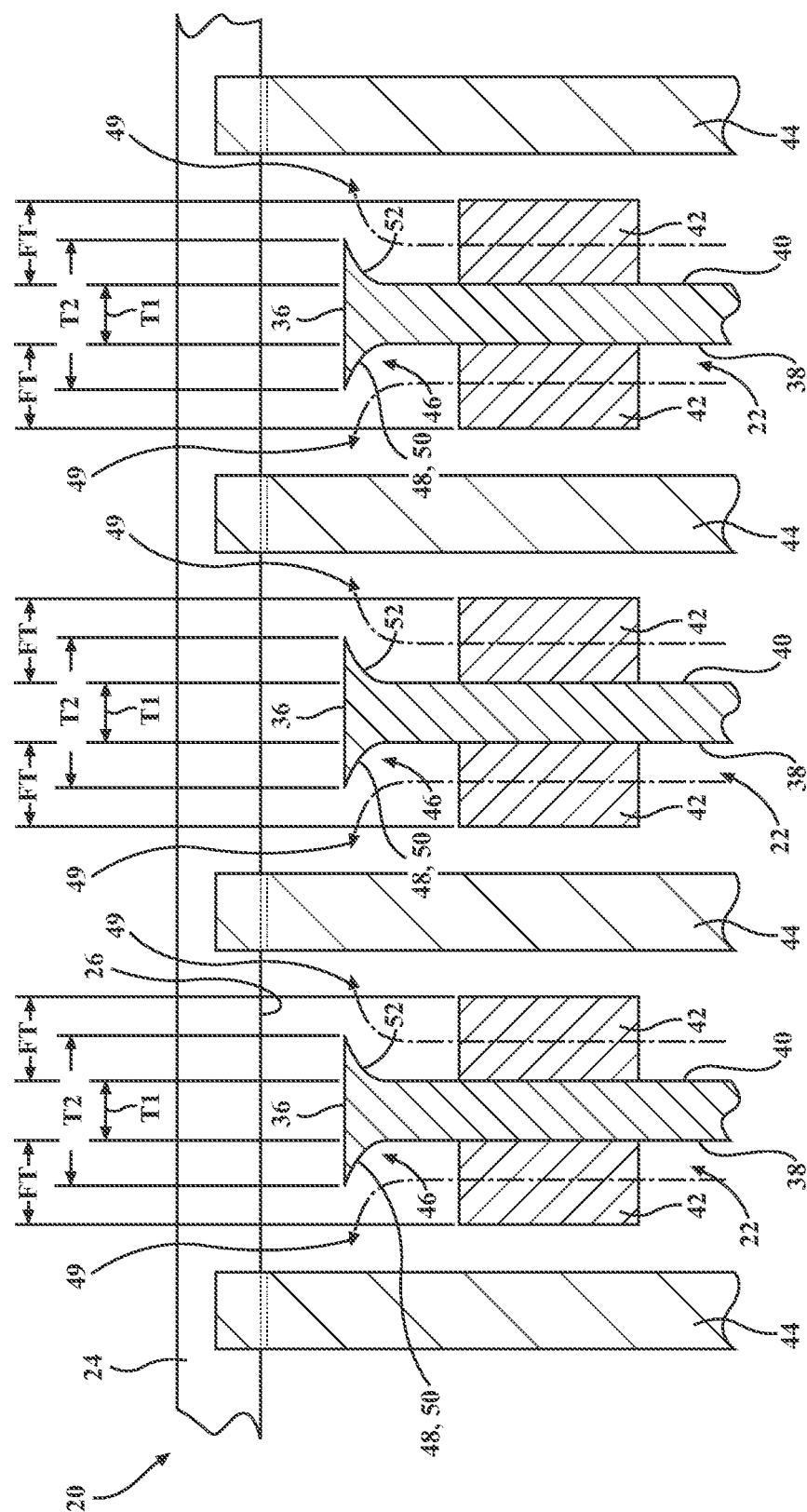
FIG. 2B is a cross-sectional view of the plurality of friction plates, with the plurality of friction plates including a core plate and a friction material, and with the plurality of friction plates being in a disengaged state.

With reference to the Figures, wherein like numerals indicate like parts throughout the several views, a clutch assembly 20 including a friction plate 22 is generally shown in FIG. 1. The friction plate 22 is used in the clutch assembly 20 for use in a wet friction system 23. Examples of wet friction systems include transmissions, particularly automatic transmissions, continuously variable transmissions, automated manual transmissions, dual clutch transmissions, wet friction brake systems, and the like. With reference to FIGS. 2A and 2B, the clutch assembly 20 includes a housing 24 defining a clutch interior 26. The friction plate 22 is disposed in the clutch interior 26. With reference to FIG. 1, the clutch assembly 20 also includes a shaft 28 having a length L and an axis A extending along the length L.

With reference to FIG. 2A through 6B, the friction plate 22 includes a core plate 30 defining a bore 32 extending along the axis A. The bore 32 receives the shaft 28 such that the core plate 30 is rotatably coupled to the shaft 28. The shaft 28 is commonly referred to as a hub. The core plate 30 includes an interior core surface 34 defining the bore 32, and an exterior core surface 36 radially spaced from the interior core surface 34 with respect to the axis A such that the exterior core surface 36 surrounds the interior core surface 34 about the axis A. The core plate 30 also includes a first clutch face 38 extending between the interior core surface 34 and the exterior core surface 36 and facing a first direction along the axis A. The core plate 30 further includes a second clutch face 40 extending between the interior core surface 34 and the exterior core surface 36 and facing a second direction opposite the first direction along the axis A.

With particular reference to FIGS. 2A and 2B, the friction plate 22 includes a friction material 42 disposed on at least one of the first and second clutch faces 38, 40. Typically, the friction plate 22 includes the friction material 42 on both the first and second clutch faces 38, 40. However, it is to be appreciated that the friction plate 22 may have the friction material 42 on only one of the first and second clutch faces 38, 40. For example, when the clutch assembly 20 includes a plurality of friction plates 22, each of the friction plates 22 are disposed about the axis A such that clutch assembly 20 includes two friction plates 22 sandwiching the other friction plates 22 between one another with respect to the axis A. In such cases, each of the two friction plates 22 sandwiching the other friction plates 22 typically only have the friction material 42 on one of the first and second clutch faces 38, 40. Typically, the clutch assembly 20 includes a plurality of pressure plates 44 disposed between the friction plates 22. The plurality of pressure plates 44 help move the friction plates 22 between an engaged position, as shown in FIG. 2A, and a disengaged position, as shown in FIG. 2B.

The core plate 30 also includes a fluid directing portion 46. A first plate thickness T1 is defined between the first and second clutch faces 38, 40 with respect to the axis A. Typically, the first plate thickness T1 is defined between the first and second clutch faces 38, 40 adjacent to the interior core surface 34 with respect to the axis A. A second plate thickness T2 is defined at the fluid directing portion 46 with respect to the axis A. The second plate thickness T2 is greater than the first plate thickness T1 such that the fluid directing portion 46 is configured to direct lubricant axially away from at least one of the first and second clutch faces 38, 40 along the axis A during rotation of the core plate 30 for limiting drag torque in the clutch assembly 20. Having the second plate thickness T2 being greater than the first plate thickness T1 limits drag torque, also known as open pack drag, in the clutch assembly 20, which ultimately increases performance of the clutch assembly 20, and increases fuel economy. Specifically, the second plate thickness T2 at the fluid directing portion 46 being greater than the first plate thickness T1 directs the lubricant axially such that the lubricant pushes each of the friction plates 22 axially away from each other to go from the engaged position, as shown in FIG. 2A, to the disengaged position, as shown in FIG. 2B. As shown in FIG. 2B, arrows 49 indicate lubricant flow, which helps force the friction plates 22 from the engaged position to the disengaged position, and helps space the friction plates 22 axially away from each other, which limits drag torque caused from the friction plates 22 rotating in the lubricant. Additionally, the core plate 30 including the fluid directing portion 46 allows the core plate 30 to have various configurations for directing lubricant, as described in further detail below, rather than using the friction material 42 for directing the lubricant. The core plate 30 including the fluid directing portion 46 rather than using the friction material 42 for directing the lubricant allows better engagement of the friction material 42 of various friction plates 22, because the friction material 42 may be designed solely for engagement rather than including various designs for directing lubricant. Specifically, the core plate 30 including the fluid directing portion 46 rather than using the friction material 42 for directing the lubricant allows the friction material 42 to be designed optimally for other purposes, such as engagement, pressure distribution, and manufacturability. However, it is to be appreciated that the core plate 30 including the fluid directing portion 46 may also be used in a friction plate that 22 that also uses the friction material 42 for directing the lubricant axially away from at least one of the first and second clutch faces 38, 40.

The friction material 42 typically has a friction thickness FT. The second plate thickness T2 is typically less than the sum of the first plate thickness T1 and the thickness of the friction material 42. In other words, when the friction plate 22 has the friction material 42 disposed on the first and second clutch faces 38, 40, the second plate thickness T2 is less than the sum of the first plate thickness T1 and the friction thickness FT of the friction material 42 disposed on both the first and second clutch faces 38, 40, as shown in FIGS. 2A and 2B. Having the second plate thickness T2 less than the sum of the first plate thickness T1 and the friction thickness FT disposed on both the first and second clutch faces 38, 40 ensures that the friction material 42, rather than the core plate 30, is engaging the friction material 42 disposed on an adjacent core plate 30. This relationship may be defined by the formula $T2<(T1+FT*2)$. By way of non-limiting example, the first plate thickness T1 may be between 0.6 mm and 1.4 mm and the friction thickness FT may be between 0.3 mm and 1.0 mm. In the example given above, the second plate thickness T2 may be 1.1 mm and less when the first plate thickness T1 is 0.6 mm and the friction thickness FT is 0.3 mm. Additionally, in the example given above, the second plate thickness T2 may be 3.3 mm and less when the first plate thickness T1 is 1.4 mm and the friction thickness is 1.0 mm.

The core plate 30 may have a waved configuration between the exterior core surface 36 and interior core surface 34 where the first plate thickness T1 is defined, as shown in FIG. 1, or may have a flat configuration between the exterior core surface 36 and the interior core surface 34 where the first plate thickness T1 is defined, as shown in FIG. 2A-6A.

The fluid directing portion 46 may be integral, i.e., one-piece, with the core plate 30. The fluid directing portion 46 may be a separate component coupled to the core plate 30, such as a ring or any other suitable component that is configured to direct the lubricant axially away from at least one of the first and second clutch faces 38, 40 along the axis A during rotation of the core plate 30. In such cases where the fluid directing portion 46 is a separate component coupled to the core plate 30, the fluid directing portion 46 may be coupled to the core plate 30 in any suitable manner, such as fastened or bonded. Additionally, when the fluid directing portion 46 is a separate component coupled to the core plate 30, the separate component, such as the ring or any other suitable component, may be comprised of a metallic or polymeric material.

In one embodiment, the fluid directing portion 46 is adjacent the exterior core surface 36. Having the fluid directing portion 46 adjacent the exterior core surface 36 allows the fluid directing portion 46 to direct the lubricant axially away from at least one of the first and second clutch faces 38, 40. In other words, the fluid directing portion 46 may be radially disposed between the exterior surface 36 and the friction material 42 with respect to the axis A. When the fluid directing portion 46 is adjacent the exterior core surface 36, the second plate thickness T2 may be defined along the exterior core surface 36. When the fluid directing portion 46 is adjacent the exterior core surface 36, the fluid directing portion 46 typically covers about 20% of the first clutch face 38. It is to be appreciated that the fluid directing portion 46 may be at any suitable location on the core plate 30. For example, the fluid directing portion 46 may be radially disposed between the interior core surface 34 and the friction material 42 with respect to the axis A.

With reference to FIGS. 2A through 5B, the fluid directing portion 46 may include a ramped surface 48 extending from the first clutch face 38 toward the exterior core surface 36 radially away from the axis A for directing the transmission fluid axially away from the first clutch face 38 along the axis A for limiting drag torque in the clutch assembly 20. In one embodiment, the ramped surface 48 has a curved configuration, as shown in FIGS. 2A, 2B, 4A, and 4B. The curved configuration of the ramped surface 48 may be further defined as a concave configuration, as shown in FIGS. 4A and 4B. In another embodiment, the ramped surface 48 may have a linear configuration, as shown in FIGS. 3A and 3B. It is to be appreciated that the fluid directing portion 46 may also include the ramped surface 48 extending from the second clutch face 40 toward the exterior core surface 36 radially away from the axis A. Specifically, the ramped surface 48 may be further defined as a first ramped surface 50, with the fluid directing portion 46 also including a second ramped surface 52 extending from the second clutch face 40 toward the exterior core surface 36 radially away from the axis A for directing the lubricant axially away from the second clutch face 40 along the axis A for limiting drag torque in the clutch assembly 20.

Figure 6A:
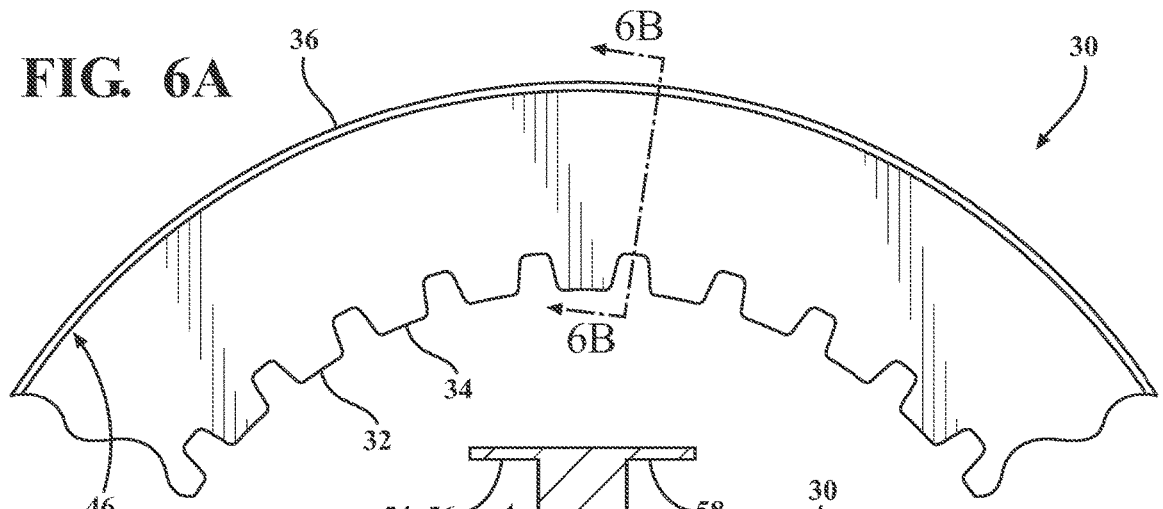
FIG. 6A is a side view of another embodiment of the core plate, with the fluid directing portion including a stop surface extending perpendicularly away the first clutch face.
Figure 6B:
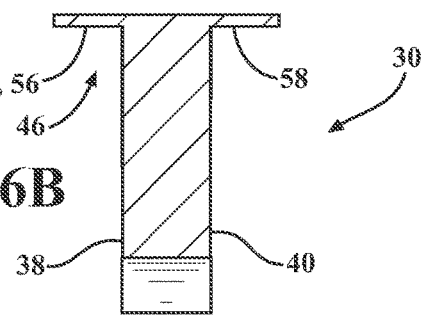
FIG. 6B is a side cross-sectional view of the core plate of FIG. 6A taken along line 6-6.

As shown in FIGS. 6A and 6B, the fluid directing portion 46 may have a stop surface 54 extending perpendicularly away the first clutch face 38 for directing the lubricant axially away from the first clutch face 38 along the axis A for limiting drag torque in the clutch assembly 20. The stop surface 54 may be referred to as an oil dam. It is to be appreciated that the fluid directing portion 46 may also include the stop surface 54 extending away from the second clutch face 40 for directing the lubricant axially away from the second clutch face 40 along the axis A for limiting drag torque in the clutch assembly 20. Specifically, the stop surface 54 may be further defined as a first stop surface, with the fluid directing portion 46 also including a second stop surface 58 extending away from the second clutch face 40 along the axis A.

Figure 5A:
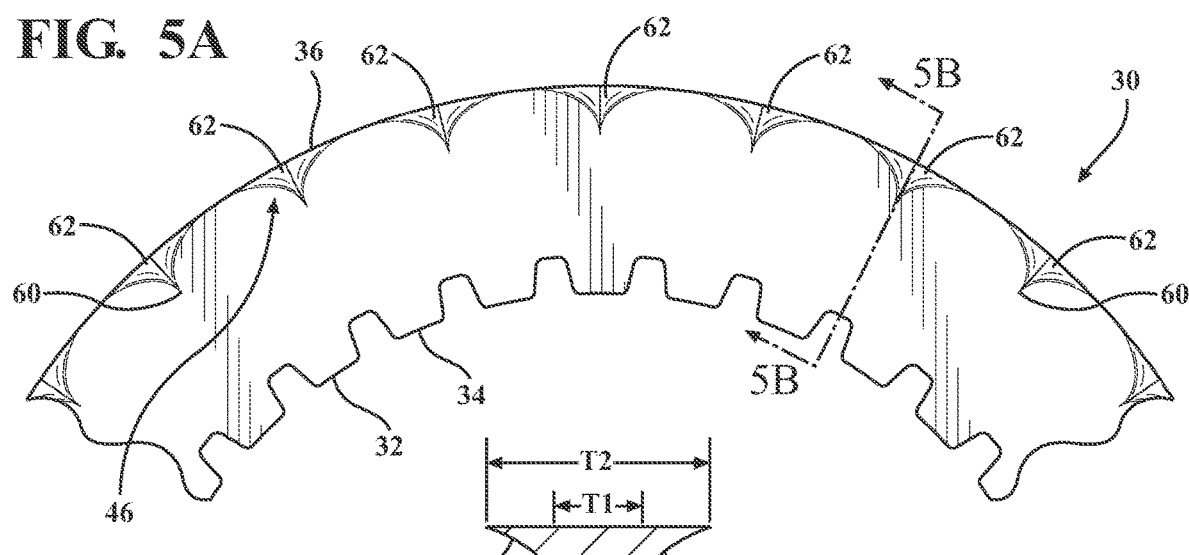
FIG. 5A is a side view of another embodiment of the core plate, with the fluid directing portion having a v-configuration.
Figure 5B:
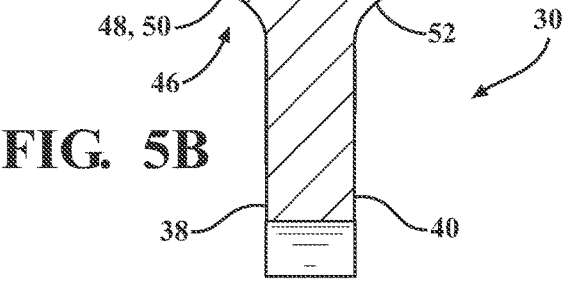
FIG. 5B is a side cross-sectional view of the core plate of FIG. 5A taken along line 5-5.

As shown in FIGS. 5A and 5B, the fluid directing portion 46 has a v-configuration with respect to the first clutch face 38. When the fluid directing portion 46 has the v-configuration, the fluid directing portion 46 has a peak 60 and a base 62 wider than the peak 60, with the peak 60 being disposed between the axis A and the base 62. The peak 60 and the base 62 of the fluid directing portion 46 direct the lubricant from the peak 60 to the base 62 and then axially away from at least one of the first and second clutch faces 38, 40. It is to be appreciated that the v-configuration of the fluid directing portion 46 may be on both of the first and second clutch faces 38, 40.

The core plate 30 may be comprised of any suitable material for use in the wet friction system 23. For example, the core plate 30 may be comprised of a metallic material. For example, such metallic materials that may be used include stainless steel, mild carbon steel, aluminum, and may contain surface treatments such as phosphate coating, nickel coating, anodizing, and the like. As another example, the core plate 30 may be comprised of a polymeric material. For example, such polymeric materials that may be used include thermoset materials and thermoplastic materials. Such thermoset materials that may be used include polyester, vinyl ester, epoxy, phenolic, urethane, polyamide, polyimide, and the like. Such thermoplastic materials that may be used include polyethylene terephthalate (PET), polypropylene, polycarbonate, polybutylene terephthalate (PBT), vinyl, polyethylene, PVC, and the like. When the polymeric material is used, the polymeric material may be used as a straight polymeric material, or may be used with reinforcement in the polymeric material, such as metal, fiberglass, carbon fiber, and the like.

A method of making the core plate 30 of the friction plate 22 for use in the clutch assembly 20 in the wet friction system 23 includes the step of forming the core plate 30 out of a polymeric material or metallic material. The core plate 30 includes the interior core surface 34 defining the bore 32 extending along the axis A, the exterior core surface 36 radially spaced from the interior core surface 34 with respect to the axis A such that the exterior core surface 36 surrounds the interior core surface 34 about the axis A, the first clutch face 38 extending between the interior core surface 34 and the exterior core surface 36 and facing a first direction along the axis A, and the second clutch face 40 extending between the interior core surface 34 and the exterior core surface 36 and facing a second direction opposite the first direction along the axis A. The core plate 30 includes the fluid directing portion 46. The first plate thickness T1 is defined between the first and second clutch faces 38, 40 with respect to the axis A. The second plate thickness is defined at the fluid directing portion 46 with respect to the axis A. The second plate thickness T2 is greater than the first plate thickness T1 such that the fluid directing portion 46 is configured to direct lubricant axially away from at least one of the first and second clutch faces 38, 40 along the axis A during rotation of the core plate 30 for limiting drag torque in the clutch assembly 20.

When the core plate 30 comprises a metallic material, the step of forming the core plate 30 comprises stamping the core plate 30 having the second plate thickness T2 being greater than the first plate thickness T1. It is to be appreciated that the when the core plate 30 comprises a metallic material, the step of forming the core plate 30 may comprise machining the core plate 30 having the second plate thickness T2 being greater than the first plate thickness T1. Stamping and machining the core plate 30 when the core plate comprises metallic material allows the core plate 30 to have various configurations of the fluid directing portion 46, such as the configurations shown in FIGS. 2A through 6B. In such embodiments, as described above, the fluid directing portion 46 is typically integral with the core plate 30, i.e., one-piece.

When the core plate 30 comprises a polymeric material, the step of forming the core plate 30 may include 3-D printing the core plate 30 having the second plate thickness T2 being greater than the first plate thickness T1. When the step of forming the core plate 30 includes 3-D printing the core plate 30 having the second plate thickness T2 being greater than the first plate thickness T1, the step of 3-D printing may comprise additive manufacturing the core plate 30 having the second plate thickness T2 being greater than the first plate thickness T1. 3-D printing the core plate 30 when the core plate 30 comprises a polymeric material allows the core plate 30 to have various configurations of the fluid directing portion 46, such as the configurations shown in FIGS. 2A through 6B. In such embodiments, as described above, the fluid directing portion 46 is typically integral, i.e., one-piece, with the core plate 30.

Furthermore, when the core plate 30 comprises a polymeric material, the step of forming the core plate 30 may include injection molding the core plate 30 having the second plate thickness T2 being greater than the first plate thickness T1. Injection molding the core plate 30 when the core plate 30 comprises a polymeric material allows the core plate 30 to have various configurations of the fluid directing portion 46, such as the configurations shown in FIGS. 2A through 6B. In such embodiments, as described above, the fluid directing portion 46 is typically integral with the core plate 30, i.e., one-piece.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A friction plate for use in a clutch assembly of a wet friction system including a lubricant, with the clutch assembly including a shaft, said friction plate comprising:
   a core plate defining a bore extending along an axis and adapted to receive and be rotatably coupled to the shaft, with said core plate comprising,
      an interior core surface defining said bore and adapted to be coupled to the shaft,
      an exterior core surface radially spaced from said interior core surface with respect to said axis such that said exterior core surface surrounds said interior core surface about said axis,
      a first clutch face extending between said interior core surface and said exterior core surface and facing a first direction along said axis,
      a second clutch face extending between said interior core surface and said exterior core surface and facing a second direction opposite said first direction along said axis; and
   a friction material disposed on at least one of said first and second clutch faces;
   wherein said core plate comprises a fluid directing portion, wherein a first plate thickness is defined between said first and second clutch faces with respect to said axis, wherein a second plate thickness is defined at said fluid directing portion with respect to said axis, and wherein said second thickness is greater than said first thickness such that said fluid directing portion is configured to direct the lubricant axially away from at least one of said first and second clutch faces along said axis during rotation of said core plate for limiting drag torque in the clutch assembly; and
   wherein said fluid directing portion is adjacent said exterior core surface.

2. The friction plate as set forth in claim 1, wherein said second thickness is defined along said exterior core surface.

3. The friction plate as set forth in claim 1, wherein said fluid directing portion comprises a ramped surface extending from said first clutch face toward said exterior core surface radially away from said axis for directing the lubricant axially away from said first clutch face along said axis for limiting drag torque in the clutch assembly.

4. The friction plate as set forth in claim 3, wherein said ramped surface has a curved configuration or a linear configuration.

5. The friction plate as set forth in claim 3, wherein said ramped surface is further defined as a first ramped surface, and further comprising a second ramped surface extending from said second clutch face toward said exterior core surface radially away from said axis for directing the lubricant axially away from said second clutch face along said axis for limiting drag torque in the clutch assembly.

6. The friction plate as set forth in claim 1, wherein said fluid directing portion has a stop surface extending perpendicularly away said first clutch face for directing the lubricant axially away from said first clutch face along said axis for limiting drag torque in the clutch assembly.

7. The friction plate as set forth in claim 1, wherein said fluid directing portion has a v-configuration with respect to said first clutch face.

8. The friction plate as set forth in claim 1, wherein said core plate is comprised of a metallic material or a polymeric material.

9. A clutch assembly including a plurality of friction plates as set forth in claim 1, further comprising a plurality of pressure plates disposed between said friction plates for assisting movement of said friction plates between an engaged position and a disengaged position, wherein said fluid directing portion is configured to direct lubricant axially away from at least one of said first and second clutch faces along said axis into said plurality of pressure plates for limiting drag torque in the clutch assembly.

10. The clutch assembly as set forth in claim 9, wherein said plurality of pressure plates extends radially away from said axis and has an exterior pressure portion adjacent said fluid directing portion, and wherein said friction material is disposed between said axis and said fluid directing portion with respect to said axis and between said axis and said exterior pressure portion with respect to said axis such that said fluid directing portion is configured to direct lubricant axially away from at least one of said first and second clutch faces along said axis into said exterior pressure portion for limiting drag torque in the clutch assembly.

11. The clutch assembly as set forth in claim 9, further comprising a housing defining a clutch interior, and said shaft disposed in said clutch interior with said core plate being rotatably coupled to said shaft.

12. The clutch assembly as set forth in claim 9, wherein said fluid directing portion of said core plate is axially spaced from and does not contact said plurality of pressure plates with respect to said axis when said plurality of friction plates are in said engaged position.

13. The clutch assembly as set forth in claim 9, wherein said plurality of pressure plates are free of a friction material.

14. The clutch assembly as set forth in claim 9, wherein said plurality of pressure plates are free of a fluid directing portion.

15. The clutch assembly as set forth in claim 9, wherein a first pressure plate portion of said plurality of pressure plates is radially spaced from said axis such that said fluid directing portion is disposed between said first pressure plate portion and said axis with respect to said axis.

16. The clutch assembly as set forth in claim 9, wherein said plurality of friction plates are internal toothed plates adapted to be rotatably coupled to the shaft, and wherein said plurality of pressure plates are external toothed plates adapted to be rotatably coupled to a housing.

17. A clutch assembly for use in a wet friction system including a lubricant, said clutch assembly comprising:
   a housing defining a clutch interior;
   a shaft disposed in said clutch interior and having a length and an axis extending along said length; and
   a friction plate disposed in said clutch interior, said friction plate comprising,
   a core plate defining a bore extending along an axis, with said bore receiving said shaft such that said core plate is rotatably coupled to said shaft, with said core plate comprising,
      an interior core surface defining said bore and coupled to said shaft,
      an exterior core surface radially spaced from said interior core surface with respect to said axis such that said exterior core surface surrounds said interior core surface about said axis,
      a first clutch face extending between said interior core surface and said exterior core surface and facing a first direction along said axis,
      a second clutch face extending between said interior core surface and said exterior core surface and facing a second direction opposite said first direction along said axis, and
   a friction material disposed on at least one of said first and second clutch faces;
   wherein said core plate comprises a fluid directing portion, wherein a first plate thickness is defined between said first and second clutch faces with respect to said axis, wherein a second plate thickness is defined at said fluid directing portion with respect to said axis, and wherein said second thickness is greater than said first thickness such that said fluid directing portion is configured to direct lubricant axially away from at least one of said first and second clutch faces along said axis during rotation of said core plate for limiting drag torque in the clutch assembly; and
   wherein said fluid directing portion is adjacent said exterior core surface.

18. The clutch assembly as set forth in claim 17, wherein said fluid directing portion comprises a ramped surface extending from said first clutch face toward said exterior core surface radially away from said axis for directing the lubricant axially away from said first clutch face along said axis for limiting drag torque in the clutch assembly.

19. A method of making a core plate of a friction plate for use in a clutch assembly in a wet friction system, said method comprising:
   forming the core plate out of a polymeric material or metallic material with the core plate comprising,
      an interior core surface defining a bore extending along an axis and adapted to be coupled to a shaft,
      an exterior core surface radially spaced from the interior core surface with respect to the axis such that the exterior core surface surrounds the interior core surface about the axis,
      a first clutch face extending between the interior core surface and the exterior core surface and facing a first direction along the axis, and
      a second clutch face extending between the interior core surface and the exterior core surface and facing a second direction opposite the first direction along the axis;
   wherein the core plate comprises a fluid directing portion, wherein a first plate thickness is defined between the first and second clutch faces with respect to the axis, wherein a second plate thickness is defined at the fluid directing portion with respect to the axis, and wherein the second thickness is greater than the first thickness such that said fluid directing portion is configured to direct lubricant axially away from the first and second clutch faces along the axis during rotation of the core plate for limiting drag torque in the clutch assembly; and
   wherein said fluid directing portion is adjacent said exterior core surface.

20. The method as set forth in claim 19, wherein the core plate comprises a metallic material, and wherein the step of forming the core plate comprises stamping the core plate having the second plate thickness being greater than the first plate thickness.

21. The method as set forth in claim 19, wherein the core plate comprises a polymeric material, and wherein the step of forming the core plate comprises 3-D printing the core plate having the second plate thickness being greater than the first plate thickness.

22. The method as set forth in claim 21, wherein the step of 3-D printing comprises additive manufacturing the core plate having the second plate thickness being greater than the first plate thickness.

23. The method as set forth in claim 19, wherein the core plate comprises a polymeric material, and wherein the step of forming the core plate comprises injection molding the core plate having the second plate thickness being greater than the first plate thickness.

\* \* \* \* \*